(12) United States Patent
Grebennikov et al.

(10) Patent No.: US 8,188,904 B2
(45) Date of Patent: May 29, 2012

(54) RF CIRCUIT WITH IMPROVED ANTENNA MATCHING

(75) Inventors: Andrei Grebennikov, Linz (AT);
Guenter Haider, Linz (AT);
Johann-Peter Forstner, Steinhoering (DE)

(73) Assignee: Infineon Technologies AG, Neubiberg (DE)

( * ) Notice: Subject to any disclaimer, the term of this patent is extended or adjusted under 35 U.S.C. 154(b) by 801 days.

(21) Appl. No.: 12/248,573

(22) Filed: Oct. 9, 2008

(65) Prior Publication Data
US 2010/0093293 A1 Apr. 15, 2010

(51) Int. Cl.
*H01Q 15/00* (2006.01)
*H04K 3/00* (2006.01)
(52) U.S. Cl. ............ 342/5; 342/118; 333/32; 343/822
(58) Field of Classification Search ............ 342/5, 118; 333/32, 124; 343/822, 852, 860–861
See application file for complete search history.

(56) References Cited

U.S. PATENT DOCUMENTS

| | | | | |
|---|---|---|---|---|
| 5,359,331 A | * | 10/1994 | Adler | 342/124 |
| 5,994,965 A | * | 11/1999 | Davis et al. | 330/295 |
| 7,071,869 B2 | | 7/2006 | Song et al. | |
| 7,177,370 B2 | * | 2/2007 | Zhang et al. | 375/297 |

OTHER PUBLICATIONS

Kim, Jeong-Geun, et al., "Balanced Topology to Cancel Tx Leakage in CW Radar," IEEE Microwave and Wireless Components Letter, vol. 14, No. 9, Sep. 2004, pp. 443-445.
Pozar, David M., "Microwave Engineering," University of Massachusetts at Amherst, Addison-Wesley Publishing Company, 3 pages.

* cited by examiner

*Primary Examiner* — Lee Nguyen
(74) *Attorney, Agent, or Firm* — Slater & Matsil, L.L.P.

(57) ABSTRACT

In one embodiment, RF front-end circuit includes a tunable matching network having an input coupled to an RF interface port, a directional coupler with a first connection coupled to an RF input of a mixer, a second connection coupled to an RF signal generation port, and a third connection coupled to an output of the tunable matching network. The directional coupler is configured to direct a signal from the RF signal generation port to the tunable matching network and to direct a signal from the tunable matching network port to the RF port of the mixer. The RF front-end circuit also has a tunable matching network control unit coupled to the tunable matching network. The control unit is configured to optimize an impedance match between the RF interface port and the output of the tunable matching network.

28 Claims, 5 Drawing Sheets

RF CIRCUIT WITH IMPROVED ANTENNA MATCHING

TECHNICAL FIELD

The invention relates generally to radio frequency circuit devices and methods and more particularly to RF circuits with improved matching to external loads.

BACKGROUND

Radar systems used for distance measurement in vehicles essentially comprise two separate radar subsystems operating in different frequency bands. For distance measurements in a short range (short range radar), radar systems currently used are typically those which operate in a frequency band around a mid-frequency of 24 GHz. Short range typically means distances from 0 to about 20 meters from the vehicle. The frequency band from 76 GHz to 77 GHz is currently used for distance measurements in the long range, which is for measurements in the range from about 20 meters to around 200 meters (long-range radar). These different frequencies are an impediment to the creation of a single concept for a radar system which can carry out measurements in a plurality of range zones, and in principle result in the need for two separate radar systems.

The frequency band from 77 GHz to 81 GHz is likewise suitable for short range radar applications, and has also been made available by the authorities for this purpose, so that a frequency range from 76 GHz to 81 GHz is now available for automobile radar applications in the short range and in the long range. A single multirange radar system which carries out distance measurements in the short and in the long range using a single radio-frequency transmission/reception module (RF front-end) has, however, not yet been feasible for various reasons. One reason is that circuits manufactured using III/V semiconductor technologies (for example gallium-arsenide technologies) are used now to construct known radar systems. Gallium-arsenide (GaAs) technologies are highly suitable for the integration of radio-frequency components, but it is generally not possible to achieve a degree of integration which is as high, for example, as that which would be possible with silicon integration because of technological restrictions. Furthermore, only a portion of the required electronics is manufactured using GaAs technology, so that a large number of different components are required to construct the overall system.

RF oscillators manufactured using SiGe-technology tunable throughout the entire frequency range from 76 GHz to 81 GHz have become possible because of the latest manufacturing technologies. These technologies allow for the production of radar systems, which are substantially more compact and more cost effective, compared to known radar systems. Beside a compact architecture, a large "field of view" of the radar sensor is desired when designing RF front-ends of radar systems, where the transmitted signal power increases with an increasing field of view.

Monostatic radar systems, which have common antennas for transmitting and receiving signals, are used because of their compact architecture. The RF front end of a monostatic radar system typically has a directional coupler (e.g., a rat race coupler) for separating the signals to be transmitted from the received signals. A received signal is down-converted to a baseband or to an intermediate frequency band (IF-band) by a mixer, which is connected to the directional coupler. The baseband signal or the intermediate frequency signal (IF-signal) being provided at the output of the mixer may be digitized for further digital signal processing.

A real directional coupler, which may be realized using microstrip lines, does not achieve ideal properties with respect to through-loss and isolation, which ideally is zero or infinity, depending on the pair of ports of the directional coupler. The oscillator signal which is supplied to an input-port of the directional coupler for being transmitted is not only coupled to the port which is connected to the antenna, but a small part of the oscillator signal (which means a fraction of the power of the oscillator signal) is also coupled to the port which is connected to a signal input of the mixer. This part of the oscillator signal is superimposed with the signal received by the antenna at the mixer input. This superimposition results in a DC signal offset at the output of the mixer which is superimposed with the baseband-signal or the IF-signal respectively. Especially when using active mixers this DC signal-offset can be very disturbing. The DC signal offset increases with an increasing transmitting power. Consequently, the DC signal-offset is a parameter limiting the power of the signal to be transmitted and therefore limiting the field of view of the radar sensor.

Even in the case of an ideal directional coupler, DC signal-offset is still a potential problem in monostatic radar systems because of impedance mismatch at the antenna port. In the presence of antenna mismatch, any oscillator signal intended to be transmitted will be reflected at the antenna port. The reflected oscillator signal will then be coupled to the signal input of the mixer and cause a DC signal-offset.

Because quarter wavelengths in the 76 GHz to 81 GHz band are less than 500 µm on silicon substrates, however, obtaining a precise match between an antenna and an RF integrated circuit is very difficult to achieve in a high volume manufacturing environment. What are needed are systems and methods for antenna matching in high frequency monostatic RF systems.

SUMMARY OF THE INVENTION

In one embodiment an RF front-end circuit includes a tunable matching network comprising an input coupled to an RF interface port, and a directional coupler comprising a first connection coupled to an RF input of a mixer, a second connection coupled to an RF signal generation port, and a third connection coupled to an output of the tunable matching network. The directional coupler is configured to direct a signal from the RF signal generation port to the tunable matching network and direct a signal from the tunable matching network port to the RF port of the mixer. The RF front-end circuit also comprises a tunable matching network control unit coupled to the tunable matching network. The control unit is configured to optimize an impedance match between the RF interface port and the output of the tunable matching network.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to illustrate clearly the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a semiconductor RF front-end circuit used in a radar system. The invention may also be applied, however, to other systems such as monostatic RF systems, RF communication systems or RF systems where transmission and reception occur at the same frequency or at frequencies very close together.

Figure 1:
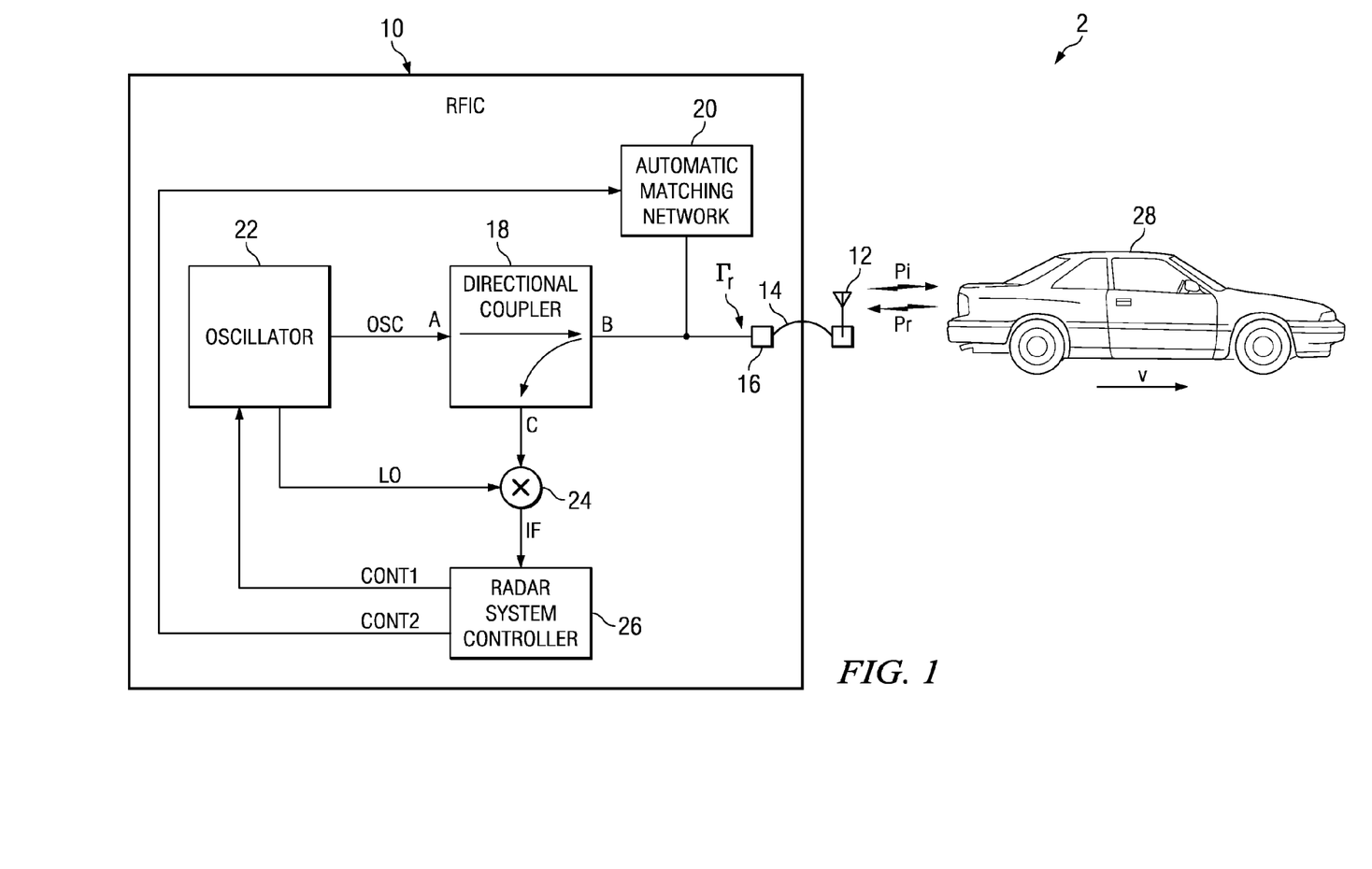
FIG. 1 illustrates a radar system according to an embodiment of the present invention.

FIG. 1 illustrates a radar system 2 according to an embodiment of the present invention. Radar system 2 includes an RF integrated circuit 10 containing an integrated radar system connected to external antenna 12. Integrated radar system 2 includes oscillator 22 for generating signal OSC to be transmitted and signal LO for mixer 24. Directional coupler 18 couples signals traveling from oscillator 22 to the antenna 12, and signals traveling from the antenna 12 to mixer 24. In various embodiments of the present invention, radar system controller 26 controls oscillator 22 and automatic matching network 20, as well as processing signal IF from the mixer 24. In some embodiments, RF integrated circuit 10 is fabricated on a silicon wafer using a silicon germanium (SiGe) bipolar process; however, in alternative embodiments of the present invention, other types of wafers, such as gallium arsenide (GaAs) can be used. In further alternative embodiments, antenna 12 may be implemented as an on-chip antenna.

Radar system 2 generates a radio signal with transmitted power $P_t$ from antenna 12. When the radio signal reaches object 28 (such as an automobile), a portion of the transmitted power is reflected. The reflected signal power $P_r$ is received by antenna 12, down converted to signal IF, and processed by radar system controller 26. Processed data from radar system controller can then be used to determine the speed and distance of object 28 to antenna 12. In automotive applications, this speed and distance data may be used, for example, to measure the relative speed of a car in front of a driver for the purpose of controlling an automatic cruise control, or to measure the presence of an obstacle in a blind spot while changing lanes or backing up.

Because of the high frequencies used in embodiments of the present invention, RF integrated circuit 10 can be bonded directly to a circuit board (not shown) in order to reduce connection parasitics. Antenna 12 can be bonded directly to output pad 16 with a short length of bondwire 14.

It can be seen that even if directional coupler 18 is an ideal coupler, (i.e., there is no coupling from port A to port C) DC offset at the output of mixer 24 is possible if the reflection coefficient $\Gamma_r$ at the antenna interface (bondpad 16) is non-zero. For example, signal OSC is coupled from port A to port B of directional coupler 18. A portion of the coupled OSC signal is reflected at the antenna interface (bondpad 16) and travels back into the circuit. The directional coupler passes the reflected OSC signal to mixer 24. Because the mixer is being operated with signal LO, which is the same frequency as signal OSC, any reflected signal generated by oscillator 22 is mixed down to DC. Excessive DC offset at the output of mixer 24 is disadvantageous because it desensitizes the RF front-end by reducing the available amount of dynamic range. In extreme cases, reflected power can even saturate the mixer 24. The DC offset reduces the maximum input signal power the system can handle, as well as possibly causing the RF circuitry to operate in regions having suboptimal noise and distortion performance.

In various embodiments of the present invention, reflection coefficient $\Gamma_r$ at the antenna interface (bondpad 16) giving rise to increase DC offset is reduced by dynamically matching antenna 12 with automatic matching network 20.

Figure 2:
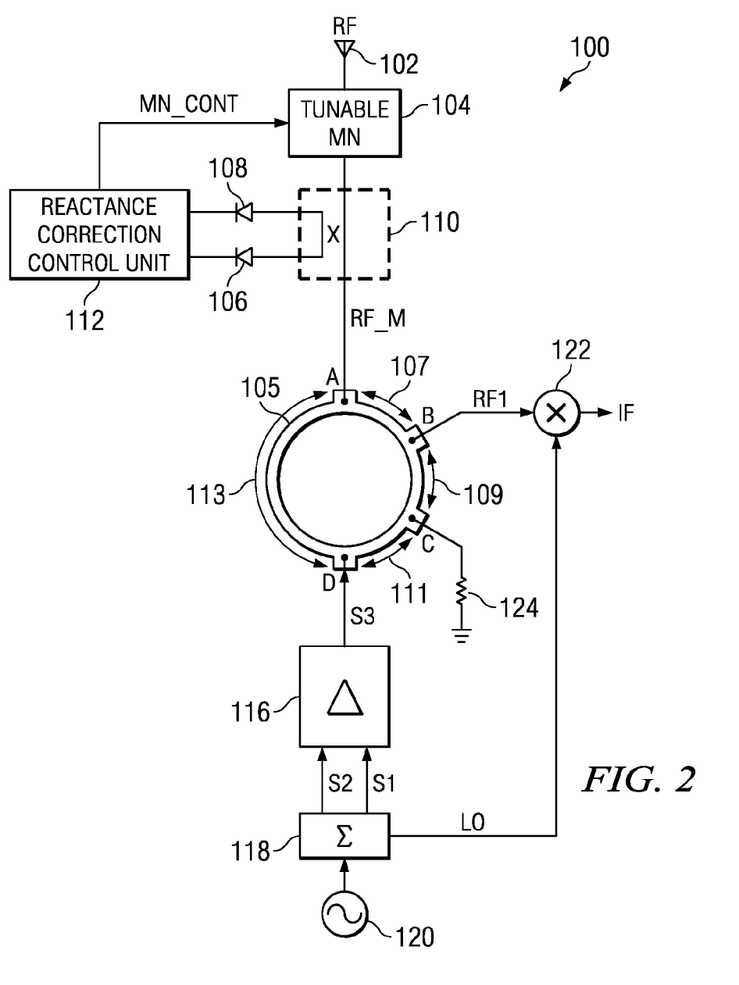
FIG. 2 illustrates an RF front-end circuit using a rat-race coupler according to an embodiment of the present invention.

Turning to FIG. 2, an RF front-end 100 according to an embodiment of the present invention is shown. The RF front end circuit has an antenna 102, a tunable matching network 104, directional coupler 105, oscillator 120, power divider 118, amplifier 116, mixer 122, coupler 110, power detectors (represented by diodes 106 and 108), and reactance correction control unit 112. Directional coupler 105 is shown as a rat-race coupler; however, other coupler architectures can be used in alternative embodiments of the present invention. The signal path and components of RF front-end 100 can comprise differential signal paths.

Dimensions of rat-race coupler 105 are chosen for the frequency band of interest. Coupler 105 has a total circumference of $3\lambda/2$ in one embodiment. For the frequency band of between 76 GHz and 81 GHz, wavelength $\lambda$ is between about 2000 μm and about 1875 μm on a silicon substrate. For the purpose of circuit implementation, a value of about 1960 μm is chosen for $\lambda$. In alternative embodiments of the present invention, other values of $\lambda$ can be used. Segment 113 can be $3\lambda/4$, and segments 107, 109 and 111 can be $\lambda/4$ each. The impedance of these lines $\sqrt{2}*Z_0$, where $Z_0$ is a system impedance, which is about 50Ω in various embodiments. While the illustration shows a circular coupler, the coupler 105 can, in fact be implemented as a folded structure. In various embodiments of the present invention, coupler 105 is implemented as a 70Ω line in a top level of metal over a ground line in a lower level of metal. Resistor 124 is 50Ω in one embodiment. Because of the high frequency and high performance sensitivity to matching, this coupler 105 is implemented differentially in one embodiment. In alternative embodiments of the present invention, other frequency ranges, coupler dimensions, coupler architectures, impedance values, and physical dimensions can be used.

The operation of rat-race coupler 105 is achieved by using phase shifts around coupler 105 to create constructive or destructive interference. For example, signal S3 traveling into coupler 103 at port D is split into two components, one of which travels clockwise in the direction of segment 113 and counter clockwise in the direction of segment 111. The two components constructively interfere at port A (which is coupled to antenna 102) because each component travels a distance of 3λ/4. At port B (which is coupled to mixer 122), however, the components destructively interfere because the clockwise component has traveled a distance of λ and the counter-clockwise component has traveled a distance of λ/2. Because of the difference of one-half wavelength, each component is 180° out of phase with each other, and the superposition of the two signals ideally renders no signal at port B. Using a similar analysis, the signal traveling into port D constructively interferes at port C. Therefore, resistor 124 absorbs half the power from amplifier 116.

Signals traveling into port A, however, constructively interfere at port B because the clockwise and counter-clockwise paths are in-phase with each other. Because of this constructive interference, any signal reflected at antenna 102 will be reflected to port A and out port B into mixer 122.

In various embodiments of the present invention, tunable matching network 104 is coupled to the antenna port. A measurement of the impedance mismatch or reflection at the tunable matching network 104 is made along a length of transmission line between matching network 104 and port A of coupler 105. In various embodiments of the present invention, coupler 110 is used to incident and reflected power at the antenna interface to power detectors represented by detection diodes 106 and 108. Power detectors represented by detection diodes 106 and 108 can be implemented by known techniques. Reactance control unit 112 processes the output of detectors 106 and 108 and outputs control signal MN_CONT that controls tunable matching network 104.

Figure 3A:
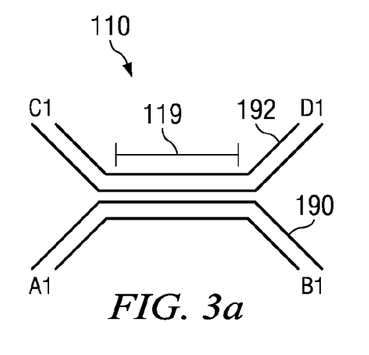
FIG. 3a-3b illustrate an embodiment coupled line coupler and an embodiment tunable matching network.

In various embodiments of the present invention, coupler 110 is implemented using a single section coupled line coupler, as shown in FIG. 3a. Single section line coupler 110 has two adjacent lines 190 and 192 in close proximity for a distance 119, which is preferably λ/4. In alternative embodiments of the present invention, lengths of less than λ/4 can be used to save space as long as the corresponding change in behavior is taken into account. In various embodiments of the present invention where the frequency band of 77 GHz to 81 GHz is used, length 119 is about 490 µm. Port A1 is coupled to coupler 105 (FIG. 2), port B1 is coupled to tunable matching network 104 (FIG. 2), and ports C1 and D1 are coupled to detectors 106 and 108 (FIG. 2) respectively. A wave incident to antenna 102 travels from port A1 to port B1, and a portion of the incident wave power is coupled to port C1. A wave reflected from antenna 102 travels from port B1 to port A1 and a portion of the reflected power is coupled to port D1.

Turning back to FIG. 2, the reactance correction control unit 112 inputs measures of the incident power from detector 106 and the reflected power from detector 108 and determines a figure of merit for the amount of power reflected by antenna 102. In various embodiments of the present invention, reactance correction control unit 112 derives a figure of merit related to the reflection coefficient; however, in alternative embodiments of the present invention, other figures of merit can be used such as a voltage standing wave ratio (VSWR), or a reflected power measurement. Reactance correction control unit 112 can be implemented using a network of analog summers and amplifiers, or a digital implementation can be used. In various embodiments of the present invention, detectors 106 and 108 are simple diode power detectors, however, in alternative embodiments of the present invention, detectors 106 and 108 could each output a signal proportional to the log of the detected powers and a simple subtraction could yield a value proportional to a dB return loss.

Once the reactance correction control unit 112 derives a figure of merit, a control signal is output to the tunable matching network in order to optimize the figure of merit. In various embodiments of the present invention, this optimization is performed by a feedback loop, where the control signal MN_CONT functions as an error signal and the figure of merit functions as the control variable. In alternative embodiments, the control signal can be increased or decreased until the figure of merit reaches a first preset threshold. In some embodiments, once the threshold is reached, further updates to the control signal can be disabled until the figure of merit degrades beyond a second threshold, in which case the control signal is modified accordingly. The first and second threshold can be selected to add hysteresis to the reactance control system in order to reduce disturbances during operation.

Figure 3B:
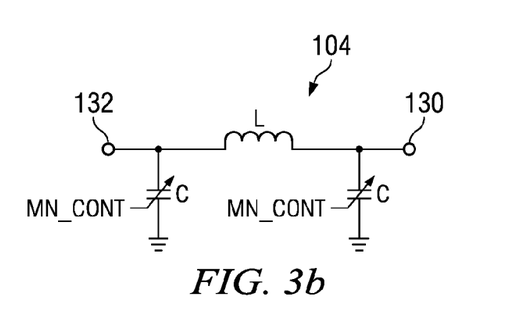

Turning to FIG. 3b, a schematic of an embodiment of tunable matching network 104 is shown. In various embodiments, a pi LC network having a series inductor L, programmable shunt capacitors $C_1$ and $C_2$, and ports 130 and 132 are used. In various embodiments of the present invention, the nominal values of these are selected to compensate bond pad capacitance. Programmable capacitors $C_1$ and $C_2$ can be voltage-controlled capacitors implemented by a varactor diode, a junction diode, or MOSFET capacitor, controlled by an analog MN_CONT signal. In various embodiments, shunt capacitors $C_1$ and $C_2$ may be controllable independently to achieve better matching. In alternative embodiments of the present invention, a switched array of individual capacitors controlled by a digital representation of signal MN_CONT can be used. In further alternative embodiments, other suitable programmable matching network structures and programmable element types can also be used.

Figure 4:
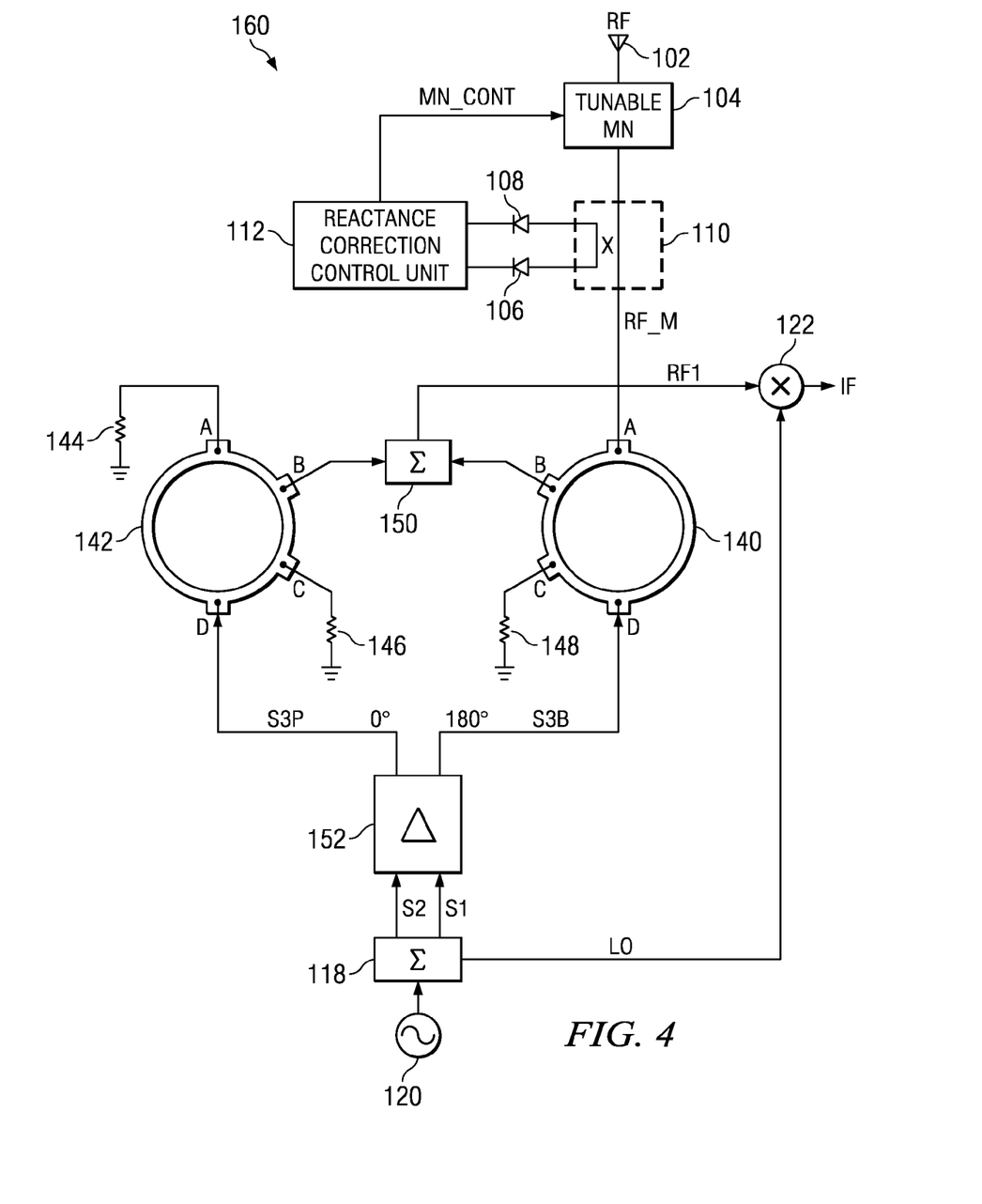
FIG. 4 illustrates an RF front-end circuit using a plurality of rat-race couplers according to an embodiment of the present invention.

Turning to FIG. 4, another embodiment of the present invention is illustrated. The embodiment of FIG. 4 is similar to the embodiment of FIG. 2, except that two directional couplers 142 and 140 and a power combiner 150 are used instead of a single coupler, and dual-output amplifier 152 is used instead of a single output amplifier. In an embodiment of the present invention, the oscillator signal is amplified by amplifier 152 and output as signals S3P and S3B that are 180° out of phase from each other.

In various embodiments, amplifier 152 is implemented as a differential amplifier, however in alternative embodiments a multiplicity of single ended amplifiers can be used depending on the application. As seen in FIG. 4, the amplifier 152 is fed with signals S1 and S2. If the oscillator has a differential architecture, signals S1 and S2 are out of phase 180° with each other. If the oscillator is single ended, however, a ring hybrid can be used to create the two out of phase signals S1 and S2. In further embodiments, other techniques can be used to create S1 and S2. Any systematic residual oscillator components remaining at ports B of directional couplers 140 and 142 are summed together and input to mixer 122. Because the output ports B of each coupler 140 and 142 are 180° out of phase with each other, these components will cancel each other out, thereby reducing the oscillator signal seen at node RF1.

Power combiner 150 can be implemented with a Wilkinson combiner; however, other architectures can be used. The signal path that includes power splitter 118, amplifier 152, directional couplers 140 and 142, amplifier, and power combiner 150 should be well matched in the layout in order to ensure good phase matching of signals S3P and S3B and, therefore, adequate cancellation of the residual oscillator signals at the input to mixer 122.

Figure 5:
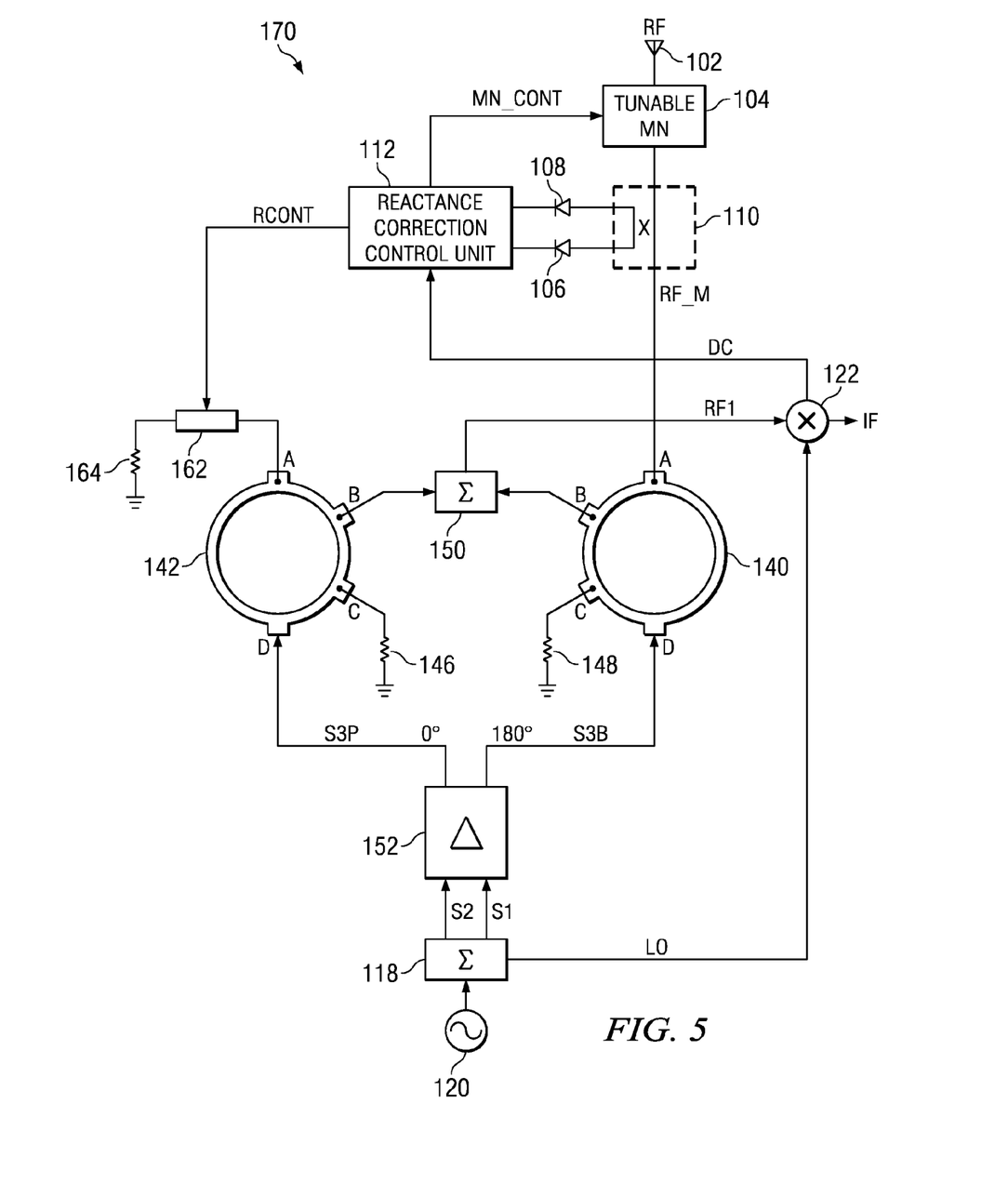
FIG. 5 illustrates an RF front-end circuit using a plurality of rat-race couplers and mixer DC feedback according to an embodiment of the present invention.

Turning to FIG. 5, a further embodiment of the present invention is illustrated. The embodiment of FIG. 5 is similar to the embodiment of FIG. 4, with the addition of additional control inputs and outputs to reactance control unit 112. Signal DC representing the DC offset of mixer 122 is input to the reactance correction control unit 112. In an embodiment of the present invention, DC offset is used as a figure of merit in addition to VSWR at the antenna interface in order to determine and control the effectiveness of the tunable matching network 104. Furthermore, the directivity of the directional coupler made from couplers 140 and 142 can be improved. Programmable impedance 162 in series with resistor 164 terminates port A of coupler 142. By adjusting the termination of this port, the balance of the directional coupler can be adjusted. In various embodiments of the present invention, both the VSWR and the DC offset of mixer 122 can be simultaneously optimized by adjusting tunable matching network 104 and programmable impedance 162 to optimize a combined figure of merit. For example, the combined figure of merit may be calculated by summing the mean-square values of the VSWR and the DC offset. In various embodiments of the present invention, an LMS algorithm can be used to optimize the system's performance. Alternatively, other optimization schemes and algorithms can be used.

Figure 6:
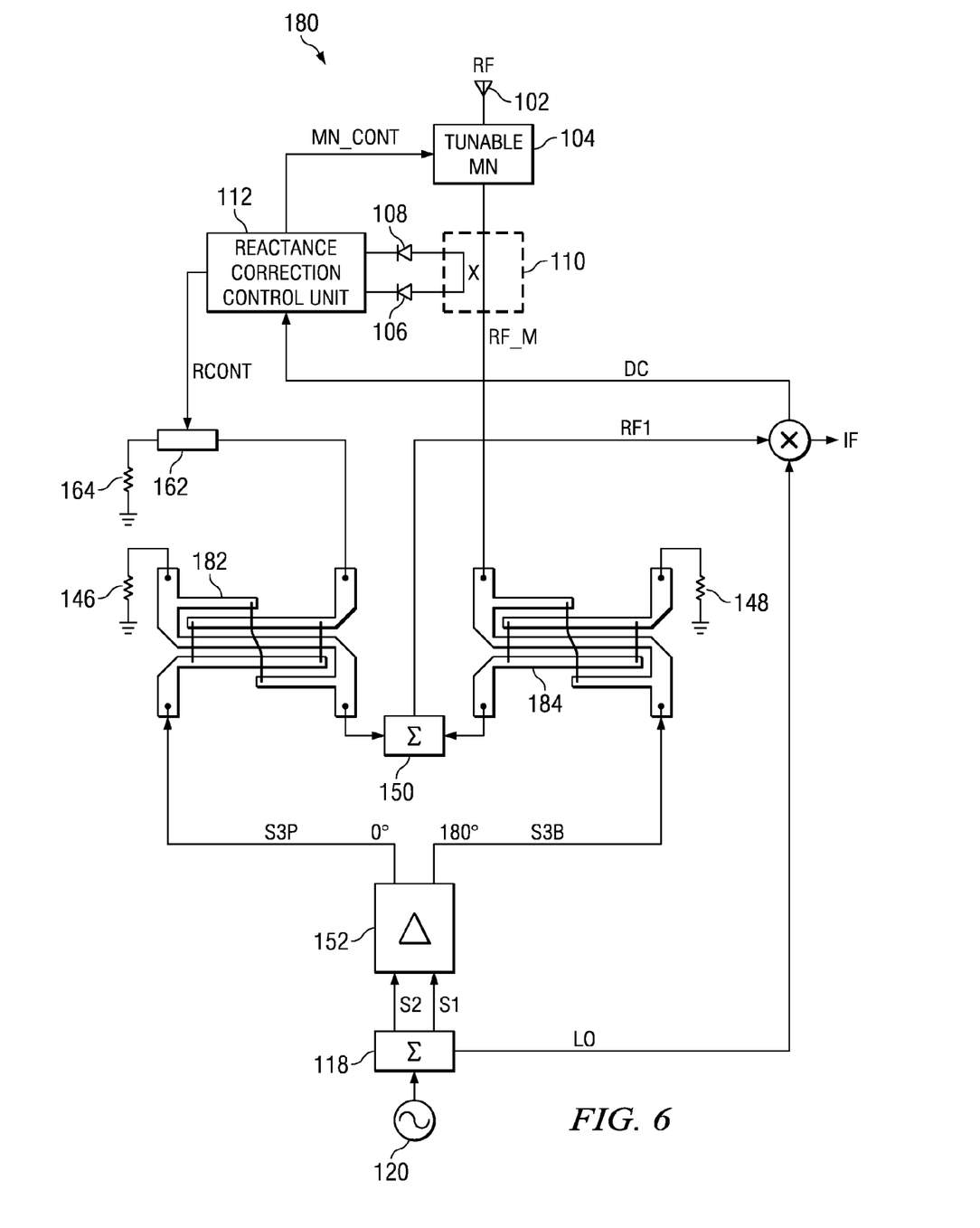
FIG. 6 illustrates an RF front-end circuit using a plurality of Lange couplers and mixer DC feedback according to an embodiment of the present invention.

FIG. 6 illustrates an embodiment of the present invention similar to FIG. 5, except that Lange couplers 182 and 184 are used instead of rat-race couplers. Lange couplers can be designed to have a wider bandwidth than a corresponding rat-race coupler. Furthermore, Lange couplers may enable more design flexibility because not all ports of the Lange coupler are DC coupled. In alternative embodiments of the present invention, other coupler architectures can be used in place of Lange couplers or rat-race couplers.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted.

What is claimed is:

1. An RF front-end circuit comprising:
   a tunable matching network comprising an input coupled to an RF interface port;
   a directional coupler comprising
      a first connection coupled to an RF input of a mixer,
      a second connection coupled to an RF signal generation port, and
      a third connection coupled to an output of the tunable matching network, wherein the directional coupler is configured to direct a signal from the RF signal generation port to the tunable matching network and direct a signal from the tunable matching network to the RF input of the mixer; and
   a tunable matching network control unit coupled to the tunable matching network, the control unit configured to adjust an impedance match between the RF interface port and the output of the tunable matching network; and
   a reflection measurement unit coupled to the output of the tunable matching network and the tunable matching network control unit, wherein the control unit is configured to adjust the tunable matching network to reduce a reflection at the output of the tunable matching network based on measurements generated by the reflection measurement unit during operation of the RF front-end.

2. The RF front-end circuit of claim 1, wherein the reflection measurement unit comprises a plurality of signal level detectors coupled to a length of transmission line at the output of the tunable matching network.

3. The RF front-end circuit of claim 1, wherein the tunable matching network control unit is further configured to adjust the tunable matching network to minimize a DC offset at an output of the mixer.

4. The RF front-end circuit of claim 1, wherein the tunable matching network control unit is configured to adjust the tunable matching network to minimize a DC offset at an output of the mixer.

5. The RF front-end circuit of claim 1, wherein the tunable matching network comprises a pi-network comprising shunt capacitors and a series inductor, wherein values of the shunt capacitors are adjustable by the tunable matching network control unit.

6. The RF front-end circuit of claim 1, further comprising:
   a power summer comprising
      an output coupled to the RF input of the mixer, and
      a first input coupled to the first connection of the directional coupler,
   a further directional coupler comprising
      a first connection coupled to a second input of the power summer, and
      a second connection coupled to a further RF signal generation port, wherein
         the further RF signal generation port is configured to provide a signal 180° out of phase with the RF signal generation port, and
         the further directional coupler is configured to direct a signal from the further RF signal generation port to the second input of the power summer.

7. The RF front-end circuit of claim 6, further comprising an adjustable resistor coupled to a port of the further directional coupler.

8. The RF front-end circuit of claim 1, further comprising an antenna coupled to the RF interface port.

9. The RF front-end circuit of claim 1, wherein the tunable matching network adjusts the impedance match in a feedback loop.

10. The RF front-end circuit of claim 1, wherein the tunable matching network is further configured to optimize the impedance match in a feedback loop.

11. The RF front-end circuit of claim 1, wherein the control unit is further configured to adjust the tunable matching network to minimize a reflection at the output of the tunable matching network.

12. A semiconductor circuit for a radar comprising:
   an antenna input;
   a tunable matching network comprising an input coupled to the antenna input;
   a reflection detector coupled to an output of the tunable matching network;
   a reactance control unit coupled to a measurement output of the reflection detector and a control input of the tunable matching network, wherein the reactance control unit is configured to reduce a reflection at the output of the tunable matching network based on measurements made by the reflection detector during operation of the radar; and
   a directional coupler configured to
      directionally couple a transmission signal from a signal generator to the output of the matching network, and
      directionally couple an antenna input signal from the output of the matching network to an input of a mixer.

13. The semiconductor circuit of claim 12, wherein the directional coupler is further configured to directionally attenuate the transmission signal from the signal generator to the input of the mixer.

14. The semiconductor circuit of claim 12, further comprising:
    a power splitter comprising
        an input coupled to the signal generator, and
        a first output coupled to an LO input of the mixer; and
    an RF amplifier comprising
        a first input coupled to a second output of the power splitter,
        a second input coupled to a third output of the power splitter, and
        an output coupled to the directional coupler.

15. The semiconductor circuit of claim 14, further comprising:
    a further power splitter coupled between the directional coupler and the input of the mixer, wherein a first input of the power splitter is coupled to the directional coupler and an output of the power splitter is coupled to the input of the mixer; and
    a further directional coupler configured to directionally couple an inverted output of the RF amplifier to a first input of a further power splitter.

16. The semiconductor circuit of claim 15, wherein the directional coupler and the further directional coupler are adjusted to null out a signal traveling from the signal generator to the input of the mixer.

17. The semiconductor circuit of claim 12, further comprising an antenna coupled to the antenna input.

18. The semiconductor circuit of claim 12, wherein the directional coupler comprises a rat-race coupler.

19. The semiconductor circuit of claim 12, wherein the signal generator generates a signal of at least 50 GHz.

20. The semiconductor circuit of claim 12, wherein the signal generator generates a signal of between about 23 GHz and about 25 GHz.

21. A radar system comprising the semiconductor circuit of claim 12.

22. The semiconductor circuit of claim 12, wherein reactance control unit is configured to reduce the reflection at the output of the tunable matching network using a feedback loop.

23. The semiconductor circuit of claim 12, wherein the reactance control unit further minimizes the reflection at the output of the tunable matching network.

24. A method of operating a radar system, the method comprising:
    measuring a reflection on a transmission line coupled to an antenna port during operation of the radar system;
    adjusting a matching network coupled to the antenna port during the operation of the radar system, wherein the reflection is reduced based on the measuring;
    directionally coupling the antenna port to a mixer;
    generating a reference signal;
    coupling the reference signal to an LO port of the mixer;
    modulating the reference signal forming a modulated reference signal; and
    directionally coupling the modulated reference signal to the antenna port.

25. The method of claim 24, wherein:
    the reference signal comprises a continuous wave signal, and
    modulating the reference signal comprises pulsing the reference signal.

26. The method of claim 24, wherein measuring the reflection comprises coupling a plurality of power detectors along a length of the transmission line.

27. A semiconductor circuit for a radar comprising:
    an antenna port;
    a tunable matching network comprising an input coupled to the antenna port;
    a directional coupler comprising a differential rat-race coupler configured to
        directionally couple a transmission signal from a signal generator to an output of the tunable matching network, and
        directionally couple an antenna input signal from the output of the matching network to an input of a mixer;
    a power splitter comprising
        an input coupled to the signal generator, and
        a first output coupled to an LO input of the mixer; and
    an RF amplifier comprising
        a first input coupled to a second output of the power splitter,
        a second input coupled to a third output of the power splitter, and
        an output coupled to the directional coupler;
    a further power splitter coupled between the directional coupler and the input of the mixer, wherein a first input of the power splitter is coupled to the directional coupler and an output of the power splitter is coupled to the input of the mixer;
    a further directional coupler comprising a differential rat-race coupler configured to directionally couple an inverted output of the RF amplifier to a first input of a further power splitter;
    a reflection detector coupled to an output of the tunable matching network comprising
        a directional coupler coupled to a length of transmission line adjacent to an output of the tunable matching network, and
        a plurality of detection diodes coupled to the directional coupler; and
    a reactance control unit coupled to a measurement output of the reflection detector and a control input of the tunable matching network, wherein the reactance control unit is configured to minimize a reflection at the output of the tunable matching network.

28. A semiconductor circuit for a radar comprising:
    an antenna input;
    a tunable matching network comprising an input coupled to the antenna input;
    a reflection detector coupled to an output of the tunable matching network;
    a reactance control unit coupled to a measurement output of the reflection detector and a control input of the tunable matching network, wherein the reactance control unit is configured to minimize a reflection at the output of the tunable matching network; and
    a directional coupler configured to
        directionally couple a transmission signal from a signal generator to the output of the matching network, and
        directionally couple an antenna input signal from the output of the matching network to an input of a mixer;
    a power splitter comprising
        an input coupled to the signal generator, and
        a first output coupled to an LO input of the mixer; and
    an RF amplifier comprising
        a first input coupled to a second output of the power splitter,
        a second input coupled to a third output of the power splitter, and
        an output coupled to the directional coupler.

* * * * *